United States Patent [19]

Meltz et al.

[11] 4,295,739
[45] Oct. 20, 1981

[54] FIBER OPTIC TEMPERATURE SENSOR

[75] Inventors: Gerald Meltz, Avon; Elias Snitzer, West Hartford, both of Conn.

[73] Assignee: United Technologies Corporation, Hartford, Conn.

[21] Appl. No.: 162,284

[22] Filed: Jun. 23, 1980

Related U.S. Application Data

[63] Continuation-in-part of Ser. No. 71,512, Aug. 30, 1979, abandoned.

[51] Int. Cl.³ .............................................. G01J 5/38
[52] U.S. Cl. .................................. 356/43; 73/339 R; 350/96.33; 356/32; 356/44
[58] Field of Search ................. 356/32, 33, 43, 44; 73/339 R; 350/96.33

[56] References Cited

U.S. PATENT DOCUMENTS

| | | | |
|---|---|---|---|
| 4,148,560 | 4/1979 | Margolis | 350/96.23 |
| 4,151,747 | 5/1979 | Gottlieb et al. | 73/356 X |
| 4,173,412 | 11/1979 | Ramsay et al. | 356/33 |
| 4,203,326 | 5/1980 | Gottlieb et al. | 356/44 |

Primary Examiner—Vincent P. McGraw
Attorney, Agent, or Firm—Richard P. Lange

[57] ABSTRACT

A multicore optical fiber having a plurality of cores positioned across the diameter of a common cladding can be so optimized to respond to either temperature or strain by the selection of materials, spacing and shape of the cores in the fiber. The cross-talk between adjacent cores in the fiber changes in response to either a change in temperature or a strain along the length of the fiber. The temperature, strain or pressure change, can be determined by measuring the relative intensity of light emerging from the different cores of the fiber. If the fiber is optimized to respond to temperature change, then a high degree of temperature sensitivity can be provided over a large unambiguous range. Alternatively, cross-talk can be made temperature insensitive so that the intensity pattern of light emerging from the various cores in the fiber is only a function of the strain exerted on the fiber.

11 Claims, 11 Drawing Figures

FIBER OPTIC TEMPERATURE SENSOR

This is a continuation-in-part of U.S. patent application Ser. No. 071,512 for FIBER OPTIC TEMPERATURE/STRAIN SENSOR filed Aug. 30, 1979, now abandoned.

CROSS REFERENCE TO RELATED APPLICATION

The subject matter of this patent application is related to U.S. patent application Ser. No. 162,283, filed June 23, 1980 by the same inventors for FIBER OPTIC STRAIN SENSOR, and it is assigned to the same asssignee.

DESCRIPTION

Technical Field

This device relates generally to optical waveguide sensors, and more particularly, to an optical waveguide having an array of cores particularly shaped and positioned in a common cladding so that the light which cross-talks between the cores changes as a function of temperature thereby acting as a temperature measuring device.

Background Art

Optical waveguides have been known for many years and, with the advent of low loss glasses, devices incorporating optical waveguides have been employed in ever-increasing numbers, in many different fields such as communications and monitors. An optical waveguide typically consists of a dielectric core fabricated from a glass, or the like, having a certain refractive index, and this core is surrounded by a second material, also normally glass or the like, having a lower refractive index. This surrounding material is generally known as the cladding. A beam of light is guided by this composite structure so long as the refractive index of the material comprising the core exceeds the refractive index of the material forming the cladding. A light beam within the core is guided generally along the core axis by reflection at the boundary between the core and the cladding.

A number of different designs for optical waveguides have been proposed including the multimode step index profile, the single mode profile, and the multimode graded index profile. Where a single mode is desired, the single mode optical waveguide is used. In such a waveguide, the diameter of the core is typically less than 10 μm and the difference between the refractive indices of the cores and the cladding is on the order of $10^{-3}$. As a result only the lowest order mode will be supported in such a waveguide.

Optical cables have also been fabricated which include multiple cores disposed in numerous different arrays and positioned within a common cladding. One such disclosure is contained in U.S. Pat. No. 4,148,560 issued Apr. 10, 1979 to D. Margolis for OPTICAL GUIDES. This disclosure is directed toward an assembly including a plurality of fibers embedded in an encapsulating material. This particular patent shows an optical bundle positioned between two reinforcing wires and embedded in a protective sheath of plastic material.

The phenomena known as "cross-talk" between cores in a common cladding occurs when the light energy propagating along one core is coupled to an adjacent core. This occurs because, as is known, the light energy is not totally confined by the boundary between the core and cladding but, in fact, it penetrates to a small degree into the cladding.

It has been recognized that the cross-talk phenomena in a waveguide having at least two cores will vary to some extent as a function of temperature. For example, in a treaties entitled OPTICAL WAVEGUIDES by N. S. Kapany and J. J. Burke published in 1972, it was recognized that in two closely spaced glass fiber cores positioned in a cladding experienced an optical beat phenomena. Beginning on page 255, there is an experiment described in which the optical beat phenomena of the aforementioned optical waveguide varies in response to changes in the ambient temperature.

A temperature sensor employing an optical waveguide is described in U.S. Pat. No. 4,151,747 issued May 1, 1979 to M. Gottlieb et al for MONTORING ARRANGEMENT UTILIZING FIBER OPTICS. A temperature sensor consists of an optical waveguide. A light source is positioned at one end of the waveguide and a detector is located at the other end. Temperature changes are then perceived by variations in the light received at the detector. Another embodiment includes two optical fibers positioned adjacent each other in a common cladding. Input light is conducted along the length of one fiber and passes out of the wall of that fiber in an amount which varies with the temperature of the fiber. The second fiber is in sufficiently close proximity to the first fiber for capturing at least some of the light passing out of the first fiber. By monitoring the light received in the second fiber, a determination can be made as to the amount of temperature variation. Of interest is a copending patent application U.S. Application Ser. No. 071,511 entitled FIBER OPTIC HOT SPOT DETECTOR filed on Aug. 30, 1979 by the same applicants which describes an optical fiber that can be embedded in a cable, or the like, to detect hot spots. A plurality of cores in the common cladding are particularly shaped and spaced from each other so that cross-talk initially occurs at the point where the temperature exceeds a predetermined level. The wavelength of the light propagating along the fiber can be changed so that the precise point of the hot spot along the cable can be identified.

Disclosure of Invention

It is an object of the present invention to provide an optical waveguide which is particularly well suited to function as a temperature responsive sensor for use in measuring either temperature variations or strain variations.

It is yet another feature of the present invention to provide an optical waveguide with an array of cores which is particularly well suited for use in a temperature monitor so that the exact temperature within a wide temperature range can be determined.

A significant feature of the present invention is that the array of cores in the optical waveguide are fabricated in a manner to optimize the response of the waveguide to variations in temperature.

A significant feature of the present invention is that an optical waveguide having a multicore array can be so fabricated that cross-talk between the cores can be made to be primarily a function of either strain alone or temperature alone. Light energy propagating along one core then is coupled to, or cross-talked, to adjacent cores only as a function of the selected parameter, either temperature or strain/pressure, thereby optimizing the sensitivity of the waveguide as a strain sensor or a temperature sensor.

The foregoing and other objects, features and advantages of the present invention will become apparent from the following description of preferred embodiments and accompanying drawings.

Best Mode for Carrying Out the Invention

Figure 1:
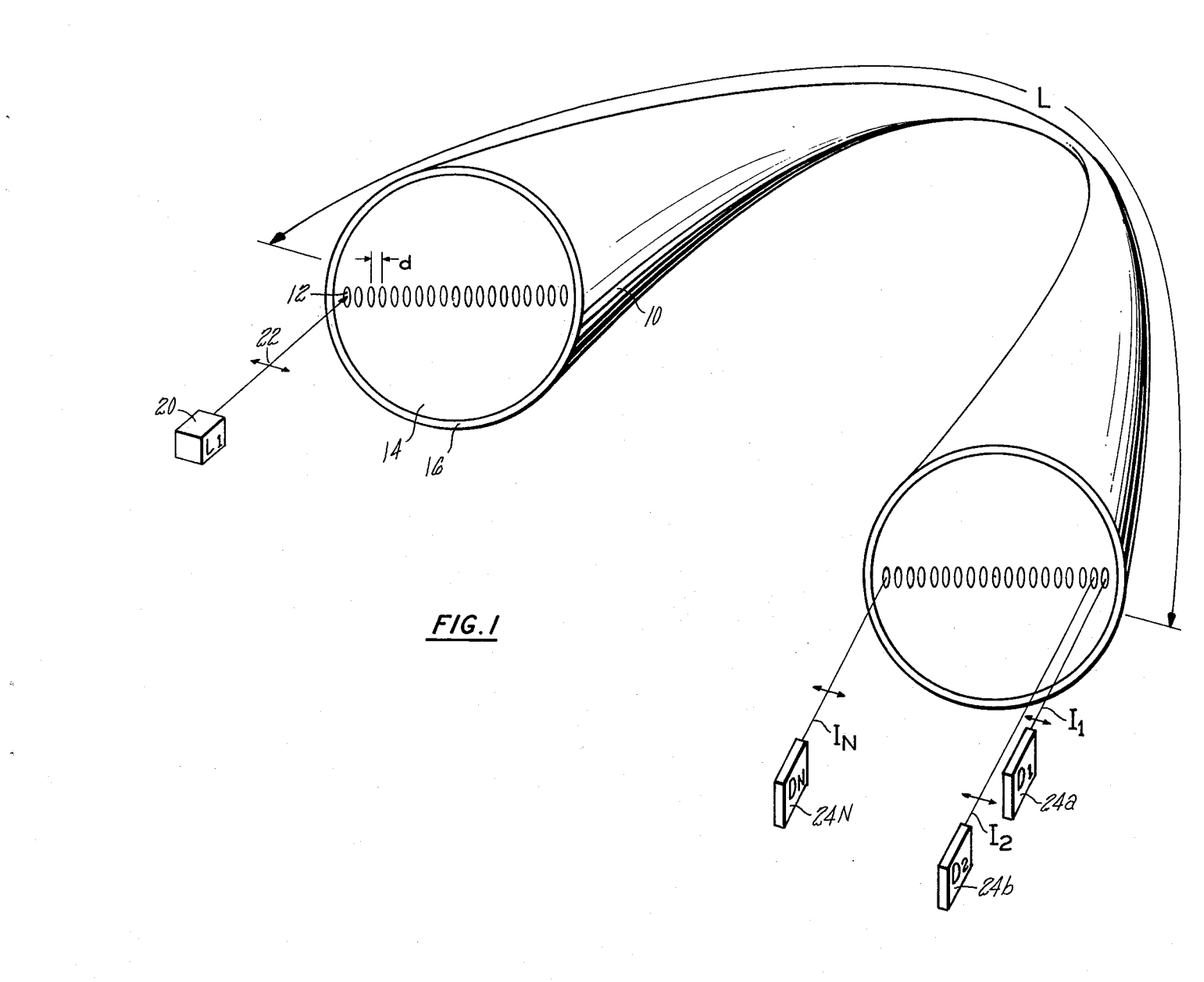
FIG. 1 is an enlarged schematic illustration of an optical fiber according to the present invention which can be optimized to measure either temperature or strain.

Referring to FIG. 1, there is seen an optical waveguide whose basic components can be optimized for use as a temperature sensor. The waveguide 10 includes a plurality of cores 12 which are preferably elliptically shaped, the significance of the elliptical shape will be more apparent hereinafter, and fabricated from a glass or the like. The cores are ideally arranged in a linear array across the diameter of the waveguide. A cladding 14, also typically fabricated from glass or the like, totally surrounds each of the cores. Although not absolutely necessary, a jacket 16 may be provided to protect the surface of the cladding against scuffing and abrasion. A linear arrangement of elliptical cores as shown in FIG. 1 is a preferred embodiment, but other core shapes, such as circular, square, or rectangular, and other core arrays, such as in a circle or close packed square or hexagonal configurations, are also possible.

As is known, so long as the refractive index of the cladding 14 is less than the refractive index of each core 12, light energy entering the core will be substantially passed by the waveguide. The number of distinct modes that will exist in each core 12 is a function of the refractive indices of both the core material and the cladding material, the dimension of each core, and the wavelength of light propagating through the waveguide. The number of modes that can exist is determined by the V parameter, which for a circular cross-section for the core is given by the relationship:

$$V = 2\pi (a/\lambda) \sqrt{n_1^2 - n_2^2} \quad (1)$$

where a is the radius of the core, $\lambda$ is the light wavelength, $n_1$ is the refractive index of the core, and $n_2$ is the refractive index of the cladding. For an elliptical cross-section, it is sufficient to take Equation (1) for the V parameter but with the value of a now given as the geometric average of the semi-major and semi-minor axis of the elliptical core dimensions. If V is less than 2.405 (the first zero of the Bessel function, $J_0$) then only the lowest order mode, known as the $HE_{11}$ mode, can be supported. For values of V that are much larger than 2.405, this occurring when the average diameter $2a$ of each core 12 is much larger or the difference between the refractive index of the core and that of the cladding is greater, then many modes will be supported by the waveguide.

As briefly mentioned heretofore, a significant feature of the present invention is the use of thermal dependence of cross-talk between the individual cores in a multicore waveguide to measure the temperature along the length of the fiber. The materials from which the core and the cladding are made are known and have refractive indices for the cores and cladding of $n_1$ and $n_2$, respectively. The spacing separating each core is relatively small while the outer diameter of the cladding is large so that interactions at the boundary formed by the outer wall of the cladding does not affect the light distribution within the cores. It is also necessary that the light propagate in each core in only the lowest order mode, the $HE_{11}$ mode, in accordance with the aforementioned Equation (1).

Referring still to FIG. 1, a light source 20 emits a beam of light energy which is incident on only one of the cores 12 in the array. The light is preferably polarized in the same direction 22 as the shortest axis of the elliptical core. As the light propagates down the fiber cross-talk occurs to the other cores. The distribution of light $I_1, I_2$ - - - $I_N$ from the exit face of the fiber is a function of the temperature of the fiber. The light signals are detected by detectors $24a, 24b$ - - - $24N$ which contain polarization analyzers so as to respond only to the same polarization 22 as was incident on core 12. From theoretical considerations and experimental results, it has been found that in some cases elliptical cores oriented with their long axis parallel to each other and perpendicular to the line joining the core centers provides stronger coupling between cores for the same core area and center-to-center spacing than is the case for cores of circular cross-section. For this elliptical core configuration, it has further been found that in some cases with the polarization parallel to the line joining the core centers, the cross-talk is greater than with the polarization perpendicular to the line joining the core centers.

Figure 2A:
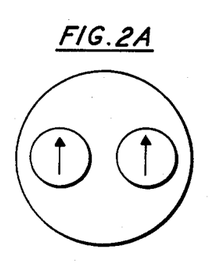
FIG. 2A–2D are schematic illustrations of possible modes that might exist in a two-core fiber.
Figure 2B:
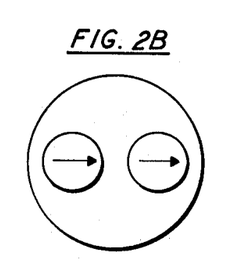
Figure 2C:
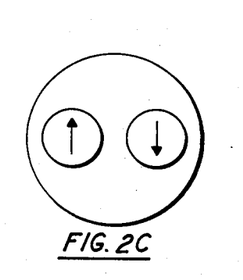
Figure 2D:
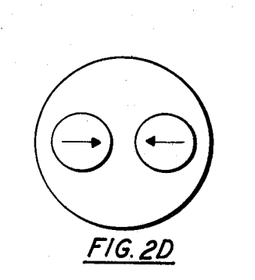

To understand the multicore array, it is helpful to initially discuss the two-core array. As the light energy propagates down one core, cross-talk occurs and the phase relationship of the modes are such that light energy is transferred between adjacent cores. As light propagates along the waveguide, modal interference causes a beat phenomena producing spatial interference that can be analyzed as an energy flow between adjacent cores. As stated above, the normal modes of the twin-core fiber are linear combinations of the lowest order $HE_{11}$ single core excitations. A normal mode is a field distribution which propagates along the fiber axis without change in its cross-sectional intensity pattern. The z (fiber axis) and time dependencies of a normal mode are given by a simple harmonic function Re[exp- $\{i(\omega t - \beta_i z)\}]$, where Re [ ... ] denotes the real part of the quantity in brackets and the propagation constant $\beta_i$ has a subscript i to designate the various possible $HE_{11}$ combinations, FIGS. 2A–2D. There are four distinct fields distributions which constitute the possible normal modes of the twin-core fiber. They consist of two orthogonally polarized, symmetric and anti-symmetric pairs (see FIG. 2). Let $\psi_i$, i=1, 2, 3, 4, designate the amplitudes of the four normal modes. Illumination of a single core is equivalent to excitation of a pair of modes; namely, a symmetric and anti-symmetric combination having the same polarization. If $\beta_1$ and $\beta_3$ are taken as the propagation constants for the symmetric mode, FIG. 2B, and the anti-symmetric mode, FIG. 2D, the division of energy between the two cores is a function of the difference $2\Delta\beta = \beta_1 - \beta_3$ and the distance along the fiber. At a distance $z_1 = \pi/(2\Delta\beta)$, the two composite modes, FIG. 2B and FIG. 2D, are exactly 180° out of phase and all the light is in the right core. For a distance less than $z_1$, some of the light is in both cores, and similarly for greater distances where the phase difference between modes continues to increase. At a distance $z_2 = 2z_1$, the composite modes are exactly in phase, as they were at the entrance face; and the light returns to the left core. As the light propagates along the twin-core fiber, mode interference causes a beat phenomena producing spatial interference that can be thought of as energy interchange between cores. The beat wavelength $\lambda_b$ is $\pi/\Delta\beta$. A change in temperature in general causes a change in $\lambda_b$ and an expansion or contraction of the fiber length L. The net effect is a corresponding variation in the beat phase $\phi = \Delta\beta \cdot L$ at the end of the fiber of initial length L. For complete cross-talk, i.e, total power transfer from the first to the second core, it is necessary that the phase velocities for the propagation in the two cores be the same. They will be the same if the two cores have the same size and indices of refraction. However, it is also possible to have two cores of different glasses with different refractive indices, and correspondingly different sizes, with the same phase velocities at the wavelength of operation of the fiber.

The thermal dependence of the beat phase in a waveguide fabricated in accordance with the present invention might be best understood by continuing to consider only the case of two adjacent cores. For two circular cores in a common cladding, the rate of change of beat phase with temperature is given by:

$$\frac{d\phi}{dT} = \frac{(n_1^2 - n_2^2)^{\frac{1}{2}}}{n_1} \frac{L}{a} V \frac{dF}{dV} (\alpha + \zeta) \quad (2)$$

where $\alpha$ and $\zeta$ are, respectively, the thermal coefficients of linear expansion and of the index of refraction ($n^{-1} dn/dT$) for both core and cladding, i.e., these material properties have been assumed to be the same for the core and cladding in this example of the present invention. For a change in temperature, there will be a change in dimensions of the fiber and a change in indices of refraction for cores and cladding. In general, both the thermal expansion coefficients and thermal coefficients of refractive indices for core and cladding materials are different; however, to simplify the present discussion the core and cladding thermal material properties have been assumed to be alike. For those skilled in the use of these quantities, the extension to the more general case from the teachings herein is straightforward. It should be recognized that even with values of $\alpha$ and $\zeta$ that are the same for core and cladding, the phenomena of cross-talk is modified with temperature. The function F in Equation (2) is defined by:

$$F = (U^2/V^3) K_0(Wd/a)/K_1^2(W) \quad (3)$$

with $$W = (V^2 - U^2)^{\frac{1}{2}} \quad (4)$$

$$U = \left(1 + \sqrt{2}\right) V/[1 + (4 + V^4)^{\frac{1}{4}}] \quad (5)$$

The $K_0$ and $K_1$ are modified Hankel functions of order zero and one, respectively.

Figure 3:
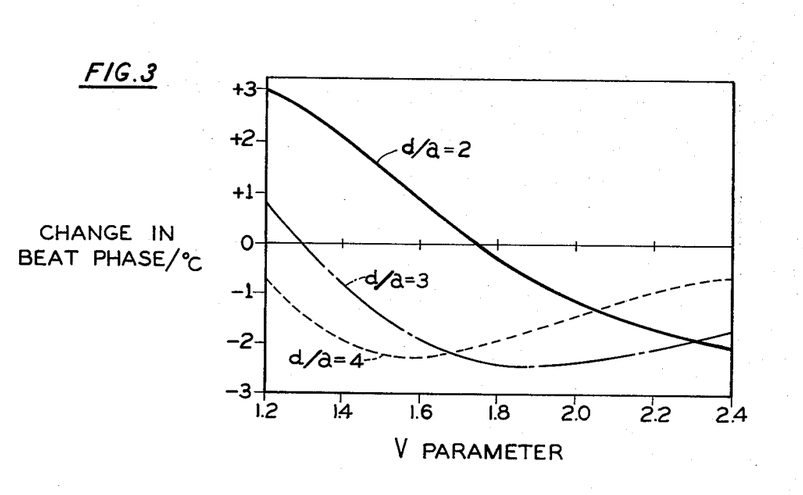
FIG. 3 is a graph depicting the change in a quantity directly proportional to beat phase per ° C. of light energy propagating along the waveguide as a function of the V parameter for several different core spacings.

By the use of the above equations the temperature dependence of the beat phase for selected glasses for the core and cladding can be obtained. For example, if the core and cladding are chosen from ordinary crown glasses with the material parameters $\alpha = 90 \times 10^{-7}/°$ C. and
$\zeta = 13 \times 10^{-7}/°$C.

the temperature dependence of a quantity directly proportional to the beat phase is given in FIG. 3 as a function of the V parameter for various values of the ratio d/a of the center-to-center core spacing to the core radius. The intensity in one core at the end of a twin core fiber is a periodic function of the beat phase. A change in temperature will then cause the apparent effect of light cycling back and forth between the two cores.

Because of the periodic variations in light intensity as a function of temperature change, to obtain an unambiguous indication of temperature the temperature range must be restricted. The range $\Delta T$ is given by $$\Delta T = \pi / \left(2 \frac{d\phi}{dT}\right) \quad (6)$$

It is useful to define a sensitivity S expressed in terms of a visibility function:

$$Q = \left| \frac{I_R - I_L}{I_R + I_L} \right| \quad (7)$$

as follows:

$$S = \left(\frac{dQ}{dT}\right)_{max} \quad (8)$$

Here $I_R$ and $I_L$ refer to the light intensity emerging from the right and left cores, respectively.

The choice of glasses and the size of the core determine v, which in turn determines $d\phi/dT$ for a given core spacing. For ordinary crown glass, the maximum value of $d\phi/dT$ with a d/a=3 occurs between V values of 1.8 and 2.0 (see FIG. 3) and the sensitivity for these V values is approximately $S \approx 7.8$ percent/°C., i.e., for a fiber 1 m long, a 1° C. change in temperature produces a 7.8 percent variation in relative intensity emerging from the two cores. The unambiguous temperature range is, from Equation (6), given by $\Delta T = 40°$ C.-meter.

For a twin core fiber with the cores made from Schott Glass ® type F-2 and cladding made from Kimble Glass ® type R-6, a temperature sensitivity of 6% of full scale per ° C. was observed for a 30 cm length of fiber with elliptical cores of 0.6 μm minor diameter and the cores positioned to have a 2.2 μm center-to-center spacing along their minor axis and the light polarized in this same direction.

The extension of the above teachings to a linear array of equally spaced identical cores in a common cladding can be obtained by considering only nearest neighbor interactions between cores. It will be shown that the use of an increasing number of cores increases the useful temperature range without decreasing the sensitivity. Assume a linear array of N equally spaced cores. Let the R'th core be illuminated with light of intensity $I_0$. The intensity of light $I(M, R)$ emerging from the M'th core for a fiber of a length L is given by:

$$I(M, R) = I_0 \left( \frac{2}{N+1} \right)^2 \sum_{r,q=1}^{N} \sin[r\pi R/(N+1)] \qquad (9)$$
$$\times \sin[q\pi R/(N+1)]$$
$$\times \sin[r\pi M/(N+1)]$$
$$\times \sin[q\pi M/(N+1)]$$
$$\times \cos[\pi L/\lambda_b \cdot (\mu_q - \mu_r)]$$

where $\mu_q = 2 \cos[q\pi/(N+1)]$ (10)
and $M, R = 1, 2, \ldots, N$.

Figure 4:
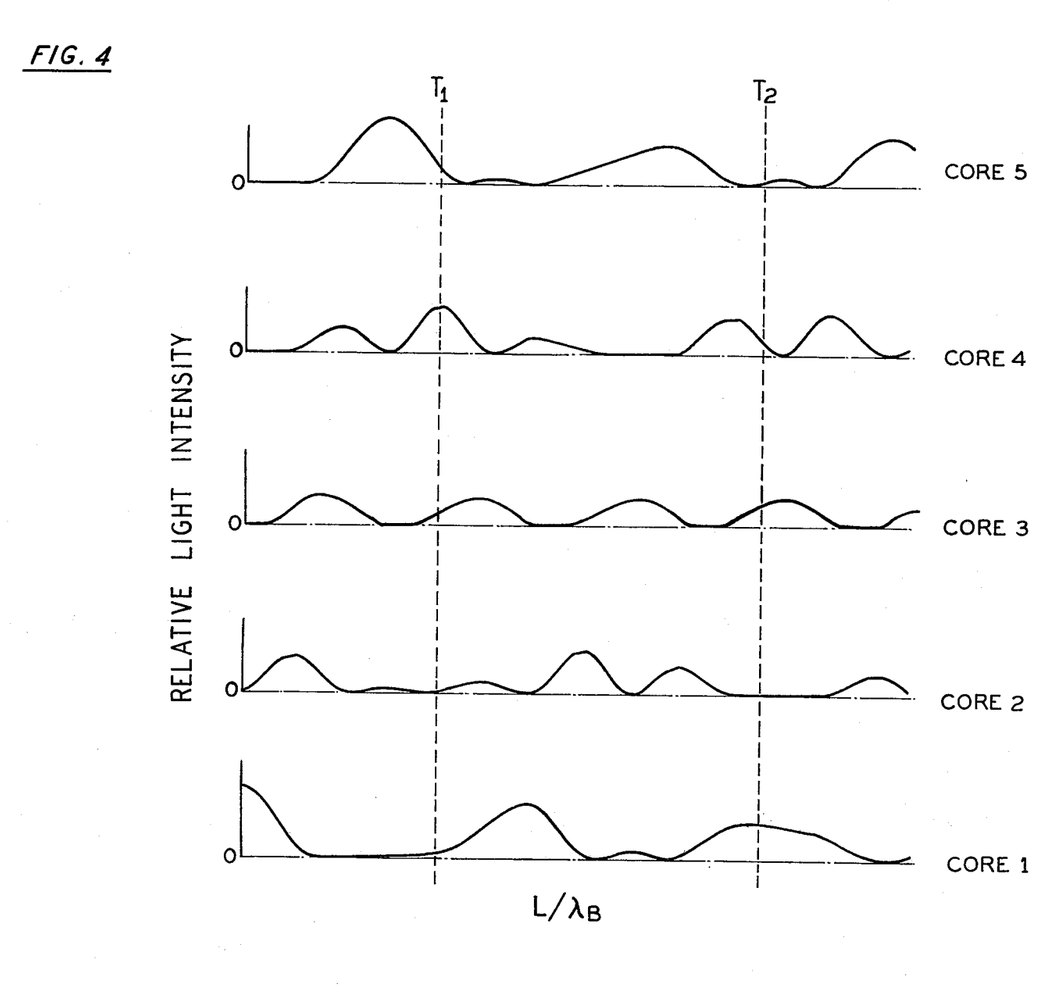
FIG. 4 is a graph depicting the relative light intensity as a function of beat phase of light energy propagating along a five-core fiber.

For the case of five equally spaced identical cores in a common cladding and for the end core illuminated (core 1), the distribution of light as a function of length L of the fiber is given in FIG. 4. The temperature dependence of the light distribution emerging from a fiber of length L can be observed in FIG. 4. The abscissa $L/\lambda_b$ is the same as $1/\pi$ times the beat phase $\phi$. The light distribution emerging from the end of the cores as a function of temperature can be obtained by noting that the beat phase $\phi$ is a linear function of temperature, so that the abscissa is equivalently the temperature T. For example, at temperature $T_1$ the light distribution from the cores is as shown by the line $T_1$ in FIG. 4. At temperature $T_2$ the light distribution is as shown by the line $T_2$ and the temperatures intermediate between $T_1$ and $T_2$ have distributions of light from the cores intermediate between the lines $T_1$ and $T_2$ in FIG. 4.

Figure 5:
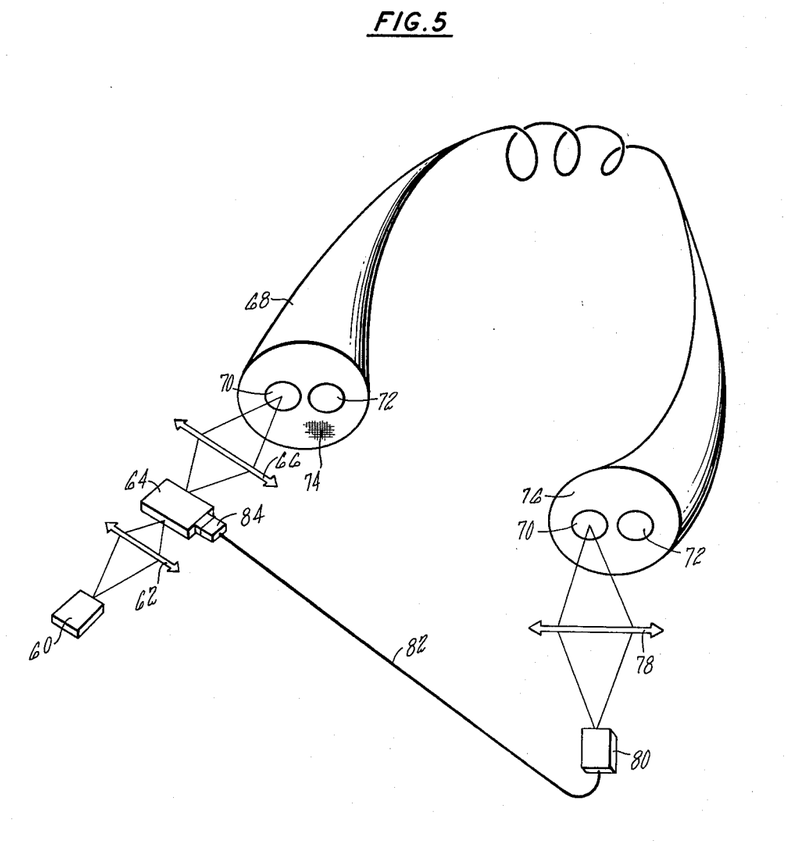
FIG. 5 is a schematic illustration of another embodiment according to the utilization of a spectral null balance system with a two-core optical fiber.

An alternative approach to measuring the temperature utilizes a spectral null balance system with feedback control as shown in FIG. 5 for the two core case. A white light source 60 is imaged by lens 62 onto the entrance slit of an electrically controlled optical monochromator 64. The output of the monochromator is imaged by lens 66 through a polarizer (not shown) onto one core of the double core fiber 68. Only core 70 and not the second core 72 is illuminated. To assure this, an opaque coating 74 can be provided on the end face and a transparent opening is aligned with the core 70. The light travels down the fiber and, in so doing, experiences cross-talk between the cores. At the exit face 76 only one core is imaged by a lens 78 through a polarizer (not shown) onto the light detector 80. This core can be either of the entrance cores 70 or 72. From the detector an electronic signal 82 is derived which increases monotonically with light intensity incident on the detector 80. The electronic signal in the wire 82 is used to drive the monochromator 64 until the electronic signal decreases to zero. With a change in temperature, the beat wavelength $\lambda_b$ changes, and with it the optical wavelength at which no light exits from core 70 changes. By monitoring the setting on the monochromator control 84, the temperature can be obtained.

Figure 6:
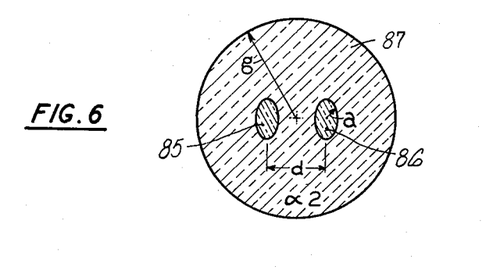
FIG. 6 is an enlarged schematic illustration of a single clad embodiment of an optical fiber according to the present invention.

If a wavelength independent temperature sensor is needed to permit the use of a broad band light source, several techniques can be used. Referring to FIG. 6, one technique involves using materials for the cores and cladding which have different values for the thermal coefficients for the refractive indices, i.e., $\zeta_1 \equiv n_1^{-1} dn_1/dT \neq \zeta_2 \equiv n_2^{-1} dn_2/dT$.

Two identical cores 85 and 86 of radius a and center-to-center spacing d are located in a single uniform cladding 87. The material parameters for the two cores 85 and 86 are $n_1$, $\alpha$ and $\zeta_1$ and the parameters for the cladding 87 are $n_2$, $\alpha_2 = \alpha$, and $\zeta_2$, i.e., only the temperature coefficients for the refractive indices are taken as different for the cores and cladding.

The dependence of the beat phase on temperature and wavelength can be written as:

$$\frac{\delta\phi}{\phi} = \frac{1}{\phi} \frac{d\phi}{dT} \delta T + \frac{1}{\phi} \frac{d\phi}{d\lambda} \delta\lambda \qquad (11)$$

where:

$$\frac{1}{\phi} \frac{d\phi}{dT} = \frac{n_2^2}{n_1^2 - n_2^2} (\zeta_1 - \zeta_2) + \qquad (12)$$
$$\frac{V}{F} \frac{dF}{dV} \left[ \alpha + \zeta_1 + \frac{n_2^2}{n_1^2 - n_2^2} (\zeta_1 - \zeta_2) \right]$$

and:

$$\frac{1}{\phi} \frac{d\phi}{d\lambda} = -\frac{V}{F} \frac{dF}{dV} \frac{1}{\lambda} \qquad (13)$$

The derivative of $\phi$ with respect to temperature in Equations (11) and (12) are taken for a fixed wavelength $\lambda$, and conversely, the $d\phi/d\lambda$ is for fixed T. The condition for wavelength independent cross-talk between the cores 85 and 86 is given by setting the right side of Equation (13) equal to zero, which leads to the requirement:

$$\frac{dF}{dV} = 0 \qquad (14)$$

The temperature dependence of the beat phase between the cores for no dependence on the wavelength is given by substituting from Equation (14) into Equation (12) to give:

$$\left( \frac{1}{\phi} \frac{d\phi}{dT} \right) \bigg|_0 = \frac{n_2^2}{n_1^2 - n_2^2} (\zeta_1 - \zeta_2) \qquad (15)$$

The vertical bar with a zero subscript specifies zero wavelength dependence.

Figure 7:
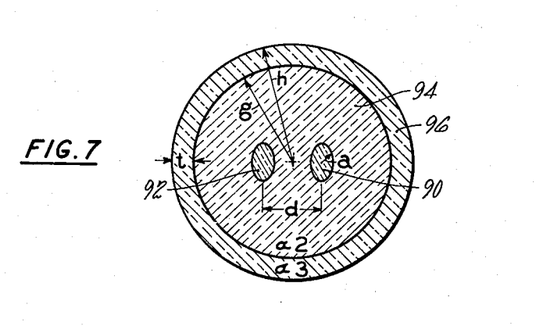
FIG. 7 is an enlarged schematic, in cross-section, of a double clad embodiment of an optical fiber according to the present invention.

Referring now to FIG. 7, there is seen another embodiment of an optical fiber which is well suited for use as a temperature sensor when used with a broad band light source. In this embodiment, two identical cores 90 and 92 having a nominal diameter a are spaced from each other by a distance d in a cladding 94. A second cladding 96 is fused onto the outer surface of the first cladding 94. The second cladding 96 is made of a material whose thermal expansion coefficient $\alpha_3$ is different from the thermal expansion coefficient $\alpha_2$ of the first cladding 94. The cores 90 and 92 and cladding 94 can have the same values for $\alpha$ and $\zeta$, or if these values are different for the core and the cladding materials (i.e., $\alpha_1 \neq \alpha_2$ and $\zeta_1 \neq \zeta_2$), the beat phase can still be made dependent on temperature but independent of wavelength. The second cladding 96 has a thickness t, and if the radius of the first cladding 94 is g, then the radius of the second cladding 96 is h=g+t. Although the cores 90 and 92 and first cladding 94 could have thermal expansion coefficients that are different, there is little loss in generality to assume that $\alpha_1 = \alpha_2$. The Young's modulii E and the Poisson's ratios $\nu$ are each assumed to be the same for all regions. The condition for the beat phase for cross-talk between cores to be independent of wavelength is still given by Equation (14), but the value for the change in beat phase with temperature is:

$$\left( \frac{1}{\phi} \frac{d\phi}{dT} \right) \bigg|_0 = \frac{1}{2} \frac{1+\nu}{1-\nu} \frac{h^2 - g^2}{h^2} (\alpha_2 - \alpha_3) \quad (16)$$

This expression is derived by applying the boundary conditions for this double clad embodiment (see, for example, "Elements of Thermal Stress Analysis" by David Burgreen, C. P. Press, Jamaica, New York (1971), pp. 239-246).

The preferred material for the second cladding 96, because of its stability, is glass; however, it is possible to use a metal or a plastic material as well, the key requirement being that the expansion coefficient for that second cladding 96 be different from the first cladding 94.

Figure 8:
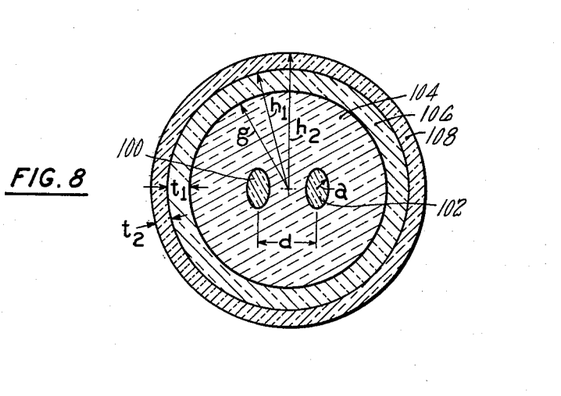
FIG. 8 is an enlarged schematic, in cross-section, of a triple clad embodiment of an optical fiber according to the present invention.

Referring finally to FIG. 8, there is seen a triple clad embodiment of an optical fiber according to the present invention which is preferred if glass is used as the second cladding. Two cores 100 and 102 having a nominal diameter a are spaced apart by a distance d in a cladding 104. Surrounding this cladding is a second cladding 106 and third cladding 108. If a low-loss optical fiber is desired, such as for telecommunications, the preferred material for the first cladding 104 is glass with high percentages of fused silica. This material has a low expansion coefficient, so of necessity, in order to obtain a different expansion coefficient in the second cladding 106, it would be necessary to use a material which has a higher coefficient of thermal expansion. Without the third cladding 108, the outer surface of the optical fiber would be under tension, thereby creating a potential problem of fiber fracture. To avoid this problem, the third cladding is provided and is formed from a material whose expansion coefficient $\alpha_4$ is less than the expansion coefficient $\alpha_3$ of the material forming the second cladding 106. The thicknesses for the two additional claddings in relation to the radius for the first cladding 104 would have to be adjusted so as to give the necessary wavelength independence and still obtain the required dependence on temperature.

Although this invention has been shown and described with respect to a preferred embodiment, it will be understood by those skilled in this art that various changes in form and detail thereof may be made without departing from the spirit and scope of the claimed invention.

We claim:

1. A temperature monitor, comprising:
   temperature responsive means including an optical fiber having a plurality of cores in a cladding, said plurality of cores being positioned in an array and extending continuously along the entire length of said optical fiber to allow cross-talk therebetween, said cladding and each of said plurality of cores being sized and formed from such materials as to support only the lowest order mode;
   source means for generating light to be coupled into one of said plurality of cores, said light being cross-talked to adjacent cores in a manner related to the temperature along the length of said optical fiber;
   detector means for receiving light energy emerging from each of said plurality of cores and for providing an electrical signal indicating the intensity of said emerging light; and
   whereby a temperature change along the length of said optical fiber causes a change in dimensions and refractive indices of said optical fiber such that the beat phase of light propagating along said plurality of cores varies as a function of temperature causing a change in intensity of light emerging from said plurality of cores of said optical fiber which is uniquely related to the temperature along said optical fiber.

2. A temperature monitor according to claim 1, further including a polarizer means through which light emerging from said optical fiber passes, so that light received by said detector means is primarily of one polarization.

3. A temperature monitor according to claim 2, further including a polarizing means cooperating with said source means such that light coupled into one of said plurality of cores has substantially a single polarization, and wherein said polarizing means positioned to filter said light emerging from said optical fiber is oriented in the same direction as said input polarizing means.

4. A temperature monitor according to claim 1, wherein said source means is a broadband source of light having multiple wavelengths of light, and wherein the temperature coefficient for the refractive indices of said plurality of cores and said cladding are different, and wherein the geometry of, and the materials parameters of, said plurality of cores and said cladding are such that the beat phase of light propagating through said fiber is dependent upon temperature variations but is independent of the light wavelength.

5. A temperature monitor according to claim 1, wherein said source means is a broadband source of light having multiple wavelengths, and wherein said optical fiber includes a first cladding in which said plurality of cores are located, and further includes a second cladding surrounding said first cladding, and wherein the thermal coefficient of linear expansion of said first cladding and said second cladding are different, and wherein the geometry of, and the materials parameters of, said plurality of cores and said cladding are such as to cause the beat phase of light propagation to be dependent upon temperature variations but independent of light wavelength.

6. A temperature monitor according to claim 1, wherein said source means is a broadband source of light having multiple wavelengths, and wherein said optical fiber includes a first cladding in which said plurality of cores are located, and further including a second cladding surrounding said first cladding, and a third cladding surrounding said second cladding, and wherein the thermal coefficient of linear expansion of said third cladding is less than the thermal coefficient of linear expansion of said second cladding, and wherein the thermal coefficient of linear expansion of said second cladding is different from that of said first cladding, and wherein the thickness of said second cladding and said third cladding is selected such that the beat phase of propagation between said plurality of cores is dependent upon temperature but independent of light wavelengths.

7. A temperature monitor according to claim 1, wherein said plurality of cores are elliptically shaped having a major axis and minor axis, and wherein said plurality of cores are positioned adjacent each other in said cladding with their minor axes aligned such that cross-talk therebetween is enhanced.

8. A temperature monitor according to claim 7, wherein light presented by said source means to one of said plurality of cores is polarized in the same direction as the minor axis of said plurality of cores, and wherein said detector means include a polarizer means so that said detector means responds primarily to light which is polarized in the same direction as said minor axis of said elliptically shaped cores.

9. A method of measuring temperature change by the steps of:
provjding a temperature responsive optical fiber at the location where the temperature is to be measured, said optical fiber having a plurality of cores in a cladding, said plurality of cores being positioned in an array to allow cross-talk therebetween, said cladding and each of said plurality of cores being sized and formed from such a material as to support only the lowest order mode;

presenting a monochromatic beam of light of a first wavelength to one of said plurality of cores from a source capable of being tuned through a preselected bandwidth to provide additional wavelengths of light;

measuring the light emerging from one of said plurality of cores of said optical fiber to the light intensity incident on said one of said plurality of cores of said optical fiber to identify a null condition at said first frequency;

varying the wavelength of said monochromatic beam of light to track said null condition as the temperature along the length of said fiber varies until a second wavelength is reached; and whereby the difference between said first wavelength and said second wavelength is proportional to the change in temperature along the length of said fiber.

10. A method according to claim 9, wherein said source for providing a monochromatic beam is a tunable laser.

11. A method according to claim 9, wherein said monochromatic beam of light is supplied by a tunable filter in conjunction with a broadband light source, said filter having a narrow bandpass which is variable over a preselected range.

* * * * *